US009318272B2

(12) United States Patent
Risser et al.

(10) Patent No.: US 9,318,272 B2
(45) Date of Patent: Apr. 19, 2016

(54) NICKEL—COBALT SUPERCAPACITORS AND METHODS OF MAKING SAME

(75) Inventors: Steven M. Risser, Reynoldsburg, OH (US); Vincent D. McGinniss, Columbus, OH (US); Bing Tan, Ann Arbor, MI (US); Kevin B. Spahr, Columbus, OH (US); Homero Casteneda-Lopez, Stow, OH (US)

(73) Assignee: Battelle Memorial Institute, Columbus, OH (US)

( * ) Notice: Subject to any disclaimer, the term of this patent is extended or adjusted under 35 U.S.C. 154(b) by 1091 days.

(21) Appl. No.: 13/384,770

(22) PCT Filed: Jul. 21, 2010

(86) PCT No.: PCT/US2010/042821
§ 371 (c)(1),
(2), (4) Date: Jun. 18, 2012

(87) PCT Pub. No.: WO2011/011561
PCT Pub. Date: Jan. 27, 2011

(65) Prior Publication Data
US 2012/0249089 A1  Oct. 4, 2012

Related U.S. Application Data

(60) Provisional application No. 61/227,407, filed on Jul. 21, 2009.

(51) Int. Cl.
| | |
|---|---|
| *H01G 9/00* | (2006.01) |
| *H01G 11/24* | (2013.01) |
| *H01G 11/36* | (2013.01) |
| *H01G 11/38* | (2013.01) |
| *H01G 11/46* | (2013.01) |

(52) U.S. Cl.
CPC .............. *H01G 11/24* (2013.01); *H01G 11/36* (2013.01); *H01G 11/38* (2013.01); *H01G 11/46* (2013.01); *Y02E 60/13* (2013.01)

(58) Field of Classification Search
USPC .......................................... 361/502; 29/25.03
See application file for complete search history.

(56) References Cited

U.S. PATENT DOCUMENTS

| | | |
|---|---|---|
| 5,079,674 A | 1/1992 | Malaspina |
| 2009/0075172 A1 | 3/2009 | Ando et al. |

FOREIGN PATENT DOCUMENTS

| | | | |
|---|---|---|---|
| JP | 2005167167 A | * | 6/2005 |

OTHER PUBLICATIONS

Notice of first Office Action from Chinese Patent Application No. 201080039604.7.
Liu et al., "Studies on Me/Al-layered double hydroxides (Me=Ni and Co) as electrode materials for electrochemical capacitors," Electrochimica Acta 49 (2004) 3137-3141.

(Continued)

*Primary Examiner* — Eric Thomas
(74) *Attorney, Agent, or Firm* — Frank Rosenberg

(57) ABSTRACT

Improved capacitors containing novel electrodes are described. One electrode composition comprises mixed metal oxides of the transition metals nickel and cobalt in a molar ratio of 0.5:1 or greater, and optionally containing a binder and carbon nanotubes. The resulting capacitors can be characterized by superior properties including higher specific capacitance values at higher voltage scan rates than the prior art. Methods of forming the electrodes that produce superior results are also described.

24 Claims, 7 Drawing Sheets

(56) References Cited

OTHER PUBLICATIONS

International Preliminary Report on Patentability in PCT/US2010/042821, mailed Sep. 23, 2011.
Fan et al. "Preparation and capacitive properties of cobalt-nickel oxides/carbon nanotube composites," Electrochimica Acta 52 (2007) 2959-2965.
Yoon et al., "CoNi Oxide/Carbon-Nanofiber Composite Electrodes for Supercapacitors," Intl. J. Electrochem. Sci. vol. 3, (2008) 1340-1347.
Kuan-Xin et al., "Preparation and electrochemical capacitance of Me double hydroxides (Me=Co and Ni)/TiO2 nanotube composites electrode," Electrochimica Acta 51 (2006) 1289-1292.
Kuan-Xin et al., "Electrodeposition of Nickel and Cobalt Mixed Oxide/Carbon Nanotube Thin Films and Their Charge Storage Properties," J. Electrochem. Soc. 153 (2006) A1568-1574.
Reddy et al., "Asymmetric Flexible Supercapacitor Stack," Nanoscale Res. Lett. (2008) 3:145-151.
Guene et al. "Preparation of Nickel-Cobalt Spinel Oxides," Bull. Chem. Soc. Ethiop. (2007) 21, 255-262.
Huang et al., "Nickel Oxide/activated Carbon Composite Electrodes for Electrochemical Capacitors," J. Power Sources, 164 (2007) 425-429.
International Search Report in PCT/US2010/042821, mailed Nov. 24, 2010.
Japanese Patent Application No. 2012-521768. Decision of Refusal mailed Dec. 9, 2014.

\* cited by examiner

NICKEL—COBALT SUPERCAPACITORS AND METHODS OF MAKING SAME

RELATED APPLICATIONS

This application is a national stage filing and claims the priority benefit of PCT/US2010/042821 filed 21 Jul. 2010 and also claims the benefit of priority U.S. Provisional Patent Application Ser. No. 61/227,407, filed 21 Jul. 2009.

BACKGROUND

Conventionally, electrical power has usually been stored in batteries. Another device for storing energy is a capacitor, and more recently the so-called supercapacitor. Very substantial efforts have been made to develop improved capacitors for storing electrical energy.

The requirement for capacitance is the ability to separate charge at a specified potential. The prototypical capacitor consists of two metal plates, with a potential difference between the plates. In the charged state, one plate will have a net positive charge, the other a net negative charge. The capacitance can be determined from the area of the plates and the separation between the plates. Placing a solid dielectric material between the plates increases the capacitance, as the same potential difference between the plates leads to larger net charge on each plate.

Recent developments in capacitor technology have led to replacement of the metal plates with high surface area conductive materials, such as carbon, and replacement of the solid dielectric with a liquid electrolyte. In case of carbon electrodes, the capacitance arises from the double layer mechanism, where the ions in the electrolyte move adjacent to the electrode surface. In this case, the capacitance increases due to two factors, the increase in the area of the electrode due to the porosity, and the decrease in the charge separation distance.

The recent developments in synthesis of high surface area materials have also led to the development of capacitors based on a second mechanism, the so-called faradaic capacitors. The faradaic capacitors are composed of a solid state electrode with a liquid electrolyte. The operation principle of these capacitors is based on reversible reactions at the interface at certain potential. There are different characteristics of the second type of capacitors; the charge transfer reaction occurs at the interface of the outer porous layer, the substrate (current collector) is a different material than the external layer. The ions are integrated in the structure of the high surface area material (commonly an oxide or nitride) by reacting either by substitution or by integration of the ion within the structure of the material. To cite just one example, see Piao et al. "Intercalation of Lithium Ions into Graphite Electrodes studied by AC Impedance measurements," J. Electrochem Soc. 146, 2794-2798 (1999). The stability will depend on the reversibility of this reaction (or process). If the reduction or oxidation process consumes more species than the reversible reaction, or if there is another species formed at the surface, the reversibility is modified.

Recently, a third type of capacitor, the "hybrid" capacitor has also been reported. In this capacitor, both the double-layer and the faradaic mechanism are used, to provide enhanced capacitance, and to take advantage of operational advantages of each mechanism.

A liquid electrolyte is either aqueous, with a high concentration of acid, base, or salt, or non-aqueous with a salt dissolved in an organic or inorganic solvent. There are a wide variety of solvents and salts available for such use, offering specific advantages depending on the application being considered (e.g., low temperature vs. high temperature). Ionic liquids based on the imidazolium cation have recently received attention as nonaqueous electrolytes in various electrochemical devices (Koch et al., J. Electrochem. Soc. 143: 155, 1996). These electrolytes have significant advantages compared to the numerous quaternary onium salts that have been previously investigated for use in carbon double-layer capacitor.

Electrochemical capacitors based on nonaqueous electrolytes offer greater electrochemical stability (up to 4 V) compared to aqueous systems (limited to approximately 1V), thereby providing greater energy storage ($E=\frac{1}{2}CV^2$). However, due to the lower conductivity of nonaqueous electrolytes compared to aqueous systems, lower power capabilities are observed. In addition, with the porous materials used in electrochemical capacitors, the high viscosity typically associated with the high dielectric constant solvents used in nonaqueous electrolytes is detrimental to conductivity in porous electrodes. Furthermore, the lower ion concentrations typically obtained with nonaqueous electrolytes result in increased electrolyte volume requirements for packaged devices.

A solid state electrode can be composed of a nanoporous transition metal compound placed on a high surface area conductive medium, such as carbon black, or carbon nanotube (CNT) films, combined with a binder to ensure physical integrity. If the ions move into the transition metal compound, the capacitance mechanism is faradaic, or possibly hybrid, while if the ions do not enter the transition metal compound the mechanism is purely double layer.

There are numerous reports in the prior art describing methods of forming electrodes from composites of carbon and metal oxides or mixed metal oxides. For example, Leela Mohana Reddy et al. in "Asymmetric Flexible Supercapacitor Stack", Nanoscale Research Letters, Volume 3, Number 4/April, 2008, describe the preparation of a supercapacitor with metal oxide and multiwalled carbon nanotubes (MWNTs) composites synthesized by a sol-gel method. Fan et al. in "Preparation and capacitive properties of cobalt-nickel oxides/carbon nanotube composites", Electrochim. Acta, 52 (2007) 2959, reported the preparation of nickel-cobalt oxides/carbon nanotube (CNT) composites. Kuan-Xin et al. in "Electrodeposition of Nickel and Cobalt Mixed Oxide/Carbon Nanotube Thin Films and Their Charge Storage Properties," J. Electrochem. Soc., 153, A1568-A1574 (2006) reported a method of electrochemically depositing a mixed metal oxide on a film of carbon nanotubes.

In U.S. Pat. No. 5,079,674, Malaspina describes a composite supercapacitor made from metal oxide and carbon black. In his method, carbon black is added to a solution of the metal salt, converted to its hydroxide or oxide, a fluorocarbon polymer added, and the resulting material is converted to sheet form and dried in an oven at a temperature of between about 80° C. and 125° C. The resulting sheet material is laminated to a separator, cut into a desired shape, and assembled to form a supercapacitor. Malaspina does not provide specific examples or capacitance data; and there is no description of the effect of synthetic conditions on material properties.

Yoon et al. in "CoNi Oxide/Carbon-Nanofiber Composite Electrodes for Supercapacitors", Int. J. Electrochem. Sci., 3 (2008) 1340-1347, report the synthesis of cobalt-nickel oxide/VGCF (vapor grown carbon fiber) composites for super capacitors. In this method, a weighed quantity of VGCF was added to a cobalt-nickel nitrate solution, sonicated for 1 hour and then dropped onto a nickel foam and annealed at 250° C. for 2 hours. Yoon et al. reported that the cobalt-nickel oxide/VGCF composite electrode exhibited a peak specific capacitance value of 1271 $Fg^{-1}$ at a scan rate of 5 $mV\cdot s^{-1}$, however neither the weight of the nickel foam substrate nor the weight of the VGCF was included in the specific capacitance calculations. The 3-dimensional nickel foam substrate has advantages over the more typical 2-dimensional metallic foil type of current collector, including providing a very high surface area for greater capacitance, but has disadvantages due to its cost, large volume and weight.

Despite extensive research and development, there remains a need for improved capacitors for the storage of energy.

SUMMARY OF THE INVENTION

In a first aspect, the invention provides a capacitor comprising: an electrode, and wherein the electrode comprises: Ni and Co in a molar ratio of greater than 0.5:1; and further possessing one or more of the following characteristics:
(a) the electrode comprises a specific capacitance of at least 450 $F/g\cdot cm^2$ if measured at a voltage scan rate of 20 mV/s in 1M KOH aqueous electrolyte; or
(b) the electrode comprises a first specific capacitance when measured at 50 mV/s and a second specific capacitance when measured at 20 mV/s; and further wherein the ratio of the first specific capacitance to the second specific capacitance is at least 0.6; or
(c) absorbance in the IR spectrum of an OH stretch that is at least as intense as other absorptions in the region from 1000 to 4000 $cm^{-1}$.

The surface area of the electrode (represented by the unit "$cm^2$") in the above-described specific capacitance is the macroscopic area of the electrode. For example, for an electrode disposed on a flat 1 $cm^2 \times 1$ $cm^2$ collector, the surface area is 1 cm2. For an electrode composition disposed on a metallic foam, the surface area would be the surface area of the metallic foam. Preferably, the electrode has a mass of at least 0.5 mg, more preferably at least 0.8 mg. In preferred embodiments, the electrode has a mass per surface area of at least 0.5 $mg/cm^2$, more preferably at least 0.8 $mg/cm^2$.

Preferably the capacitor has a first specific capacitance when measured at 50 mV/s and a second specific capacitance when measured at 20 mV/s; and further wherein the ratio of the first specific capacitance to the second specific capacitance is at least 0.6; more preferably at least 0.8, and in some embodiments, in the range of 0.9 to 1.0. Alternatively, the electrodes preferably have a normalized capacitance of at least 0.5 (or at least 0.7, or in the range of 0.5 to about 0.8) at an average voltage scan rate of 100 mV/s, more preferably at an average voltage scan rate of 200 mV/s, and still more preferably at an average voltage scan rate of 300 mV/s.

Preferably, the the electrode has a mass in the range of 0.1 to 2 mg. Also, preferably, the electrode comprises a specific capacitance of at least 550 F/g if measured at a voltage scan rate of 20 mV/s in 1M KOH aqueous electrolyte. Since it has been surprisingly discovered that electrodes comprising carbon nanotubes preform better than other forms of carbon, the electrode preferably comprises at least 5 weight % carbon nanotubes.

In some preferred embodiments, the electrode comprises a current collector, and there is a denser layer of the composite deposited closer to the current collector, and the denser layer is more conductive than a second layer of the composite that is further from the current collector.

The invention further provides a capacitor comprising any of the electrode materials described herein; an electrolyte; a second electrode; and a circuit that can form an electrical pathway between the first electrode and the second electrode.

The electrolyte can be a nonaqueous liquid or an aqueous liquid. The first and second electrodes can be the same or can be composed of two distinct metal oxides.

The invention also includes a solar energy system comprising the capacitor of any of claims 15-17 and a photovoltaic cell.

In another aspect, the invention provides a method of making an electrode, comprising: forming a composition comprising Ni and Co in a molar ratio of at least 0.5:1; reacting the composition to form a gel; drying the gel to obtain a powder comprising Ni and Co in a molar ratio of 0.5:1 to 4:1; and compacting the powder to form an electrode.

In a further aspect, the invention provides a method of making an electrode, comprising: forming a composition comprising Ni and Co in a molar ratio of at least 0.5:1 wherein the temperature of the process never exceeds 200° C., more preferably the temperature of the process never exceeds 50° C.

In another aspect, the invention provides a method of storing energy comprising: applying a potential to the capacitor described herein and removing the potential; and wherein, after the potential is removed, an electrical potential persists between the electrodes.

The inventive capacitors are especially useful for rapidly storing or providing energy. Examples include such applications as storing braking energy from cars or trains, capturing energy from lightning strikes, accelerating vehicles or other objects, or providing rapid energy spikes for electrical or electromagnetic devices. The inventive capacitors are especially useful for storing energy from renewable energy sources such as solar, wind, and tidal. In these systems, charge is stored during periods of high energy production, and can be used when little or no energy is being collected. The capacitor may have parallel plates. Alternatively, the capacitor can be in the form, for example, where the electrodes and separators can be alternately stacked, wound into a roll, and electrolyte poured in, then sealed to form a supercapacitor energy storage device.

Glossary

The "weight %" (weight percentage composition) of a compound, refers to its % by weight measured at 20° C. For example, a composite electrode made by mixing 4 mg of Ni2Co oxide and 6 mg of carbon nanotubes (at 20° C.) would be 40 weight % Ni2Co oxide and 60 weight % carbon nanotubes.

For purposes of the present invention, a "capacitor" (or supercapacitor) that includes two electrodes that are typically separated by a separator. Note that the electrodes may include any of the electrodes described herein. The capacitors of this invention may store energy via a double layer mechanism and may also incorporate energy storage through the intercalation of charge into the electrode materials. Note further that, although a separator is typically desirable for structural stability, in some highly rigid structures it is possible to omit the separator. The two electrodes are also connected, or connectable, to an external circuit that is the energy source during charging, and is where useful work can be done during discharge of the capacitor.

"Capacitance" (see also "specific capacitance" below) is the ability of a body to hold an electrical charge. It is also a measure of the amount of electrical energy stored (or separated) for a given electric potential. A common form of energy storage device is a parallel-plate capacitor, as described above. In a parallel plate capacitor, capacitance is directly proportional to the surface area of the conductor plates and inversely proportional to the separation distance between the plates. If the charges on the plates are +Q and −Q, and V gives the voltage between the plates, then the capacitance (C) is given by: C=Q/V The SI unit of capacitance is the farad (F); 1 farad is 1 coulomb per volt.

A "Current collector" is a well-known term that refers to a conductive component of a capacitor, and is used to lead electrical power away from the electrodes.

An "Electrical current" is a flow of electric charge (a phenomenon) or the rate of flow of electric charge (a quantity). This flowing electric charge is typically carried by moving electrons, in a conductor such as wire; in an electrolyte, it is instead carried by ions, and, in a plasma, by both.

An "Electrical circuit" is an interconnection of electrical elements such as resistors, capacitors, voltage sources, current sources, and switches that has a closed loop, giving a return path for the current.

An "Electrode" is a well-known term that refers to a conductive component of a capacitor that contacts the electrolyte.

"Electrolyte" is a composition comprising one or more ionic species and a medium through which ions can move. In some preferred embodiments, the electrolyte comprises an aqueous medium containing dissolved ions. In other preferred embodiments, the electrolyte comprises a non-aqueous liquid, preferably containing less than 100 ppm water, and containing a dissolved salt.

"Intercalating" refers to the reversible inclusion of lithium into an electrode.

"Ionic species" means an ion, or a compound that forms an ion as part of an electrolyte (i.e., forms an ion under conditions in the capacitor; for example, a carboxylic acid can be converted to an ion in the appropriate solvent).

"Lithium salts" are well known materials for use in electrolytes and include compounds such as $LiN(SO_2CF_3)_2$, $LiBF_4$ or $LiPF_6$. Alkali hydroxides are well known materials for use in aqueous electrolytes, and include compounds such as LiOH and KOH.

"Metal oxides" comprise transition metal atoms connected by bridging oxygen atoms. Metal oxide particles may also contain other atoms such as B, N, C, Al, Zn, etc. Metal oxides will often also comprise hydroxyl groups which diminish in concentration with heating. In some preferred embodiments, metal oxides consist essentially of transition metals (or metal), oxygen, and, optionally, H in the form of hydroxides.

"Mixed metal oxides" are metal oxides comprising at least two different transition metals. The inventive materials typically comprise an amorphous phase and are believed to contain Ni and Co atoms bridged by oxygen (Ni—O—Co) may contain bridging or terminal hydroxides.

"Nanoparticles" are particles in the size range of 1 to 1000 nm, preferably in the range of 1 to 100 nm.

"Potential" or the "voltage" between two points is a short name for the electrical force that would drive an electric current between those points. Specifically, voltage is equal to energy per unit charge. In the case of static electric fields, the voltage between two points is equal to the electrical potential difference between those points.

A "Separator" is a porous sheet placed between the positive and negative electrodes in an electrolyte. Its function is to prevent physical contact of the positive and negative electrodes while serving as an electrolyte reservoir to enable free ionic transport. Typically, the separator is a polymeric or ceramic microporous membrane or a nonwoven cloth. The microporous membranes are preferably 25 μm or less in thickness and have an average pore size of 1 μm or less (volume average).

A "Solar energy system" is a system harnessing the energy from the sun. For our purposes it comprises a capacitor and a photovoltaic cell.

"Specific capacitance" is the total capacitance divided by the mass of the electrode, and so has units of Farads per gram (F/g). The specific capacitance is often reported in the literature, as a measure of how effectively charge is being stored in or adjacent to the electrode. The total capacitance is of the most interest as a measure of the value of the material for commercial applications. All specific capacitance values reported in this document will be based on the total mass of the electrode, including the binder and the conductive component.

DETAILED DESCRIPTION OF THE INVENTION

Figure 1A:
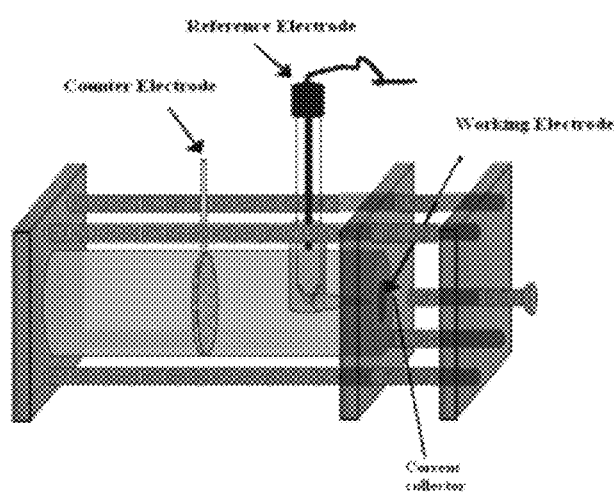
FIGS. 1A and 1B illustrate half cell designs for measuring electrochemical properties.

Solid state electrodes for supercapacitors can be formed, for example, from oxides, hydroxides, sulfides, phosphates (or combinations thereof) of the transition metals cobalt and nickel in a composite material comprising a conductive material such as CNT and/or carbon black. The composite material typically comprises an amorphous phase and may also comprise a crystalline phase (x-ray diffraction is a technique that can be used to characterize the crystallinity of the material). For superior properties, the material should contain hydroxyls (as can be seen by IR spectroscopy).

A preferred electrode of the present invention comprises oxides of Ni and Co having a Ni and Co in a molar ratio in the range of 0.5 to 6, more preferably a molar ratio in the range of 4 to 1, and in some embodiments, a molar ratio of 4 to 2. In some embodiments, additional transition metal elements may also be present in the metal oxide; for example, Fe, Mn, or a combination of Fe and Mn. In other embodiments, the transition metals in the electrode consist essentially of, or consist of, nickel and cobalt. In some embodiments, the electrode materials may consist essentially of, or consist of, Ni—Co oxide particles, a conductive carbonaceous material, and a binder.

In addition to the Ni—Co oxide in particle form, the electrodes typically contain carbon as the conductive phase. Carbon materials are well known, and a variety of carbon particles may be used in the electrodes. In some preferred embodiments, the carbon material comprises carbon nanotubes (CNTs), in some embodiments at least 5 weight % CNTs as a percent of the mass of the electrode. In some preferred embodiments, the electrode comprises 40 to 90 weight % metal oxide particles (preferably nanoparticles) and 10 to 60 weight % carbon. In some embodiments, the electrode comprises 65 to 90 weight % metal oxide particles (preferably nanoparticles) and 10 to 30 weight % carbon. For analyzing a material of unknown synthetic origin, the relative weights of carbon and metal oxide can be determined by removing the carbon such as by combustion. The electrodes may be characterized by a superior performance when substituting CNTs for carbon as the conductive component.

Typically, one or more binders are added in order to form the electrode in a desired shape and adhere the electrode to the current collector. Binders for making electrodes are known. Nonlimiting examples of binders include: PTFE, Nafion, Epoxy resin, Polyvinylidene fluoride (PVDF), Polyvinylidene fluoride-hexafluoropropylene (PVDF-HEP), $ZrO_2$, and $TiO_2$. Since binders reduce conductivity, when binders are present, it is preferred to keep them at a level of 5 mass% or less of the electrode's mass. For purposes of the present invention, mass % calculations do not include the mass of the collector. In some preferred embodiments, the composite material is directly deposited on a collector without any support material; for example, without a metal foam support. In some preferred embodiments, the collector is a flat plate.

A supercapacitor also includes an aqueous or nonaqueous electrolyte. Examples of nonaqueous solvents for electrolytes include propylene carbonate (PC), ethylene carbonate (EC), dimethyl carbonate (DMC), diethyl carbonate (DEC), 1,2-dimethoxyethane (DME), 1,2-diethoxyethane (DEE), and blends of more than one non-aqueous solvent. As is known in the art, electrolytes further comprise a material which readily separates into positively and negatively charged species. This material is commonly a salt. In the present invention, the salts preferably contain Li ions and counter ions such as $PF_6^-$, $BF_4^-$. For aqueous electrolytes, this material may any material that readily separates into positively and negatively charged groups, such as KCl, KOH or LiOH.

In some preferred embodiments, the electrolyte comprises 10-30% ethylene carbonate and 70-90% propylene carbonate. In some preferred embodiments, the carbonate solution comprises 15-25% ethylene carbonate and 75-85% propylene carbonate. In some preferred embodiments, the electrolyte comprises aqueous KOH. The electrolyte can be used in conjunction with electrodes containing a metal oxide, preferably mixed with carbon.

The electrodes may be characterized by any of the properties described in the examples. For example, a specific capacitance (or, alternatively, total capacitance) of the same level or greater than that shown in the examples.

The electrodes may be characterized by a higher capacitance value when composed of multiple layers of the mixed NiCo oxide/carbon/binder composite rather than a single layer of NiCo oxide/carbon/binder composite. In some embodiments, the electrode may be made from two separate depositions of the same composition. In some other preferred embodiments, the electrode comprises at least two layers that have different compositions. The compositions can differ by the relative amounts of binder, carbon, Nickel and Cobalt, Ni/Co ratio, and combinations of these. The electrodes may also be characterized by a higher capacitance value when composed of multiple layers of the mixed NiCo oxide/carbon/binder composite wherein a denser layer of the composite is deposited closer to the current collector, and/or wherein the first layer (nearer the collector) is more conductive than the second layer (further from the collector).

In some embodiments, the method of making the electrodes may be characterized by a higher capacitance value when subjected to a step of drying at room temperature. Preferably, drying is conducted for at least 5 hours, or preferably at least 10 hours, or more preferably at least 20 hours. In some preferred embodiments, drying is conducted in air or in a humid environment. In some embodiments, the electrodes are made by a process including an air drying step of 5 to 30 hours. Preferably, the electrodes are made with only one drying step. Preferably, drying is conducted a temperature of 80° C. or less, more preferably 50° C. or less, and still more preferably 30° C. or less. The method of making the electrodes may further be characterized by a higher capacitance value when subjected to a first step of vacuum drying followed by a second step of drying. Preferably, the vacuum drying step is at least 5 minutes, more preferably at least 10 minutes, or at least 30 minutes. In some embodiments, vacuum drying is conducted for 5 minutes to an hour.

The electrodes can be made using mixed metal oxides that are obtained by the sol-gel method to obtain a xerogel or aerogel which can then be ground into a powder and incorporated into an electrode. The mixed metal oxides can be made by a hydrolysis method. Alternatively, in some embodiments, epoxides are reacted with the metal compound(s) to form a gel.

The electrodes may be made at a temperature of below 50° C., in some embodiments the electrodes can be made at a temperature of 30° C. or less. In some preferred embodiments, the electrode is made by combining components at a temperature between −100° C. and 30° C., and in some preferred embodiments between 0° C. and room temperature.

For the entire synthesis including all drying steps, the mixed metal oxides are preferably not heated above 250° C., more preferably not heated above 200° C., even more preferably not heated above 100° C., in some embodiments not heated above 50° C., and in some embodiments not heated above 30° C. In some other embodiments the mixed metal oxides are not heated above room temperature for the entire synthesis. Thus, the electrodes are preferably made in a process that does not include a calcination step.

A preferred electrode of the present invention, is characterized, as is shown in the examples, by a better performance at high voltage scan rates than the prior art, including higher specific capacitance values.

The electrodes may also be characterized by a specific capacitance as a function of mass per surface area. It is well known in the literature that the specific capacitance can decrease with increasing thickness of the active layer. One method to obtain high specific capacitance is then to use a very thin layer of the active material. However, for most applications, this approach increases the amount of area needed to achieve a certain level of total capacitance beyond what is practical. Therefore, specifying the specific capacitance in terms of mass per unit area ensures the measurement is performed in a realistic environment.

EXAMPLES

Electrochemical Characterization

Figure 1B:
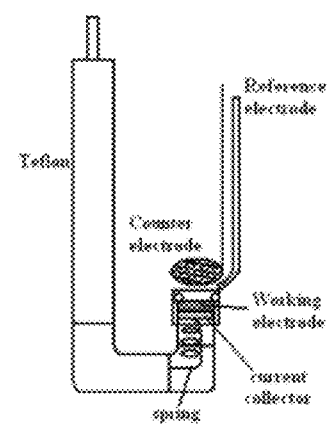

The fabricated electrodes were characterized to determine their capacitance, voltage window, open circuit potential, and other parameters. FIG. 1 shows a half-cell configuration used for measuring the capacitance of the electrodes.

The general sequence of experiments used to characterize the electrodes includes the following steps:
- Open circuit potential with time (1 h)
- Electrochemical Impedance Spectroscopy (10 mV amplitude) 10 KHz to 0.01 Hz
- Cyclic voltammetry (aqueous solutions 0.7V vs. SCE to −0.7 vs. SCE)
- Analysis of the results (currents, voltage and capacitance)

The values of specific capacitance reported here are measured using cyclic voltammetry. Although some electrodes have been characterized for 100 voltage cycles or more, the reported capacitance is routinely determined from the second voltage cycle. In the present invention, specific capacitance can be determined for the second voltage cycle; in some embodiments, after 10 voltage cycles or 100 voltage cycles.

Comparison to Literature Capacitance Measurements

Two types of capacitance values will be reported here, the total capacitance and the specific capacitance. The specific capacitance is the total capacitance divided by the mass of the electrode, and so has units of F/g. The specific capacitance is often reported in the literature, as a measure of how effectively charge is being stored in or adjacent to the electrode. The total capacitance is of the most interest, as a measure of the value of the material for commercial applications.

Care must be exercised when comparing the data of this invention to data reported in the open literature. The common practice in the literature is to report the specific capacitance of metal oxide electrodes by dividing the measured capacitance by the mass of the metal oxide only. The largest capacitance values that are reported typically occur when the oxide is approximately 10% of the total electrode mass. For example, in 2006 *J. Electrochem. Soc. pp. A*1451, the authors present data for the capacitance of vanadium oxide deposited onto CNT films, when measured at a scan rate of 1 mV/sec, as shown in Table 1.

TABLE 1

Specific capacitance of $V_2O_5$ on CNT films taken from the literature.

| % mass of $V_2O_5$ | Capacitance using Vanadium mass | Capacitance using total electrode mass |
|---|---|---|
| 8.9 wt % | 1230 F/g | 109.5 F/g |
| 33.9 wt % | 650 F/g | 220.4 F/g |
| 51.3 wt % | 310 F/g | 159 F/g |

From Table 1, we see that the reported best value of 1230 F/g for the vanadium oxide capacitance is actually from the electrode with the lowest total capacitance. In many cases, the conductive component of the electrode will contribute double layer capacitance, which should also be accounted for. In cases where the transition metal compound is only 10% of the electrode mass, the double layer capacitance can be of the same order of magnitude as the faradaic component.

To avoid these complications, all specific capacitance values reported in this document will be based on the total mass of the electrode, including the binder and the conductive component, but not including the mass of the collector (however, it would include a support material such as a foam, if present).

Metal Oxide/Hydroxide Synthesis and Characterization

Two approaches to synthesize metal nanoparticles are a hydrolysis process, or a xerogel process. In preferred cases, the particles are expected to have a high degree of hydroxide nature, as the drying occurs at a temperature below that normally needed to completely convert the hydroxide to oxide. These materials will be referred to generically as oxides throughout the text. In cases where the material is labeled with elements and numbers, such as Ni2Co, this indicates the oxide was formed at a nominal starting molar ratio of two Ni to one Co. Representative synthesis methods for the oxides are included below.

Sample Synthetic Methods

Preparation of "in-situ" Ni2Co-CNT(15%) Mixed Oxide Xerogel 0.185 gram of $NiCl_2*6H_2O$, 0.093 gram of $CoCl_2*6H_2O$ were dissolved in 2 gram of ethanol. To this solution, 0.036 gram of CNT was added and the solution was ultrasonicated for 30 minutes. 1 gram of propylene oxide was added into the dispersed CNT solution under stirring. The solution was left sealed overnight and then dried at 50° C. in air.

Preparation of Mixed Metal Oxide/Hydroxide Aerogel 2.20 g $FeCl_3.6H_2O$, 1.85 g $NiCl_2.6H_2O$, and 0.59 g water were dissolved in 20 g ethanol. 10 g propylene oxide (PPO) was added quickly into the alcoholic solution under stirring with a gel forming in less than 16 minutes. The formed gel was aged with sealing for several days at room temperature. The solvent (ethanol and water) in the gel was exchanged with acetone at least three times (one day one time). The acetone exchanged gel was finally dried by supercritical $CO_2$. Nickel-cobalt mixed oxide/hydroxide could be prepared in a similar fashion, starting with 1.85 g $NiCl_2.6H_2O$ and $CoCl2*6H2O$ 0.93 g.

Preparation of Metal Oxides by Hydrolysis

Metal oxides can be prepared by hydrolysis; for example by combining a metal-containing aqueous solution with a hydroxide solution. The addition of a hydroxide solution causes precipitation of a metal oxide.

Electrode Fabrication

Electrodes for testing were fabricated using two procedures:

Method A
- The metal oxide was ground by hand to a fine powder.
- The conductive component (if used) was added to the oxide powder and ground again.
- Approximately 20 mg of the powder was added to a mortar, and then the appropriate amount of binder was added from a 5% in solvent mixture.
- Approximately 150 mg of 1-methyl-2-pyrroidinone (NMP) was added.
- The mixture was again ground to form a paste. The paste was then applied to the current collector substrate (stainless steel or Nickel).
- The metal oxide on stainless steel electrode was then heated for 1 hour at 100° C. until all solvents evaporated.
- A Nylon filter disc was then placed over the dried metal oxide electrode. The electrode/filter disc assembly was then placed in the electrochemical apparatus for measurement.
- The filter disc is used to ensure the electrode stays in place in the test cell. The filter disk has sufficient porosity that it should not alter the diffusion of charge or electrolyte.

Method B

The metal oxide was ground by hand to a fine powder and calcined at 450° C.

70 mg Ni4Co1, 25 mg AB, and 109 µl 5 wt % Nafion were dispersed in 2 gram of tert-butyl alcohol.

The mixture was ultrasonicated for 30 minutes and then stirred for overnight.

The stirred paste was ultrasonicated for 30 minutes before depositing on Nickel current collector electrodes.

For the deposition, 22 µL paste solution was taken out and dropped onto a Ni substrate.

The obtained uniform film was dried in air for 2 hours and the weight of electrode material was recorded.

The air-dried sample was then dried in a vacuum oven (~20 psig at 100° F.) overnight.

The electrode/filter disc assembly was then placed in the electrochemical apparatus for measurement.

Several different conductive media were used, including acetylene black (AB), Ketjen black (KB), carbon nanotubes (CNT), multi-wall carbon nanotubes (MWNT), polypyrrole doped onto $TiO_2$, and polypyrrole mixed with carbon black. The active area of the Ni current collectors used for aqueous measurements is approximately 1 $cm^2$, while the active area of the stainless steel collectors used for all non-aqueous measurements is approximately 1.12 $cm^2$.

Prior Art Example

Dependence of CNT Electrodes

Figure 2:
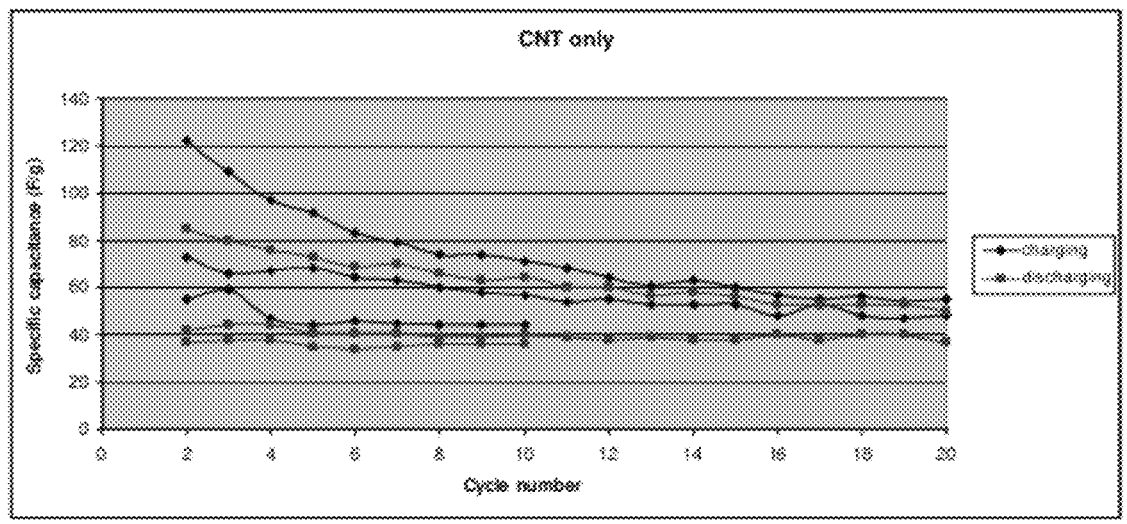
FIG. 2 shows specific capacitance as a function of CV cycle number for CNT electrodes.

We show the specific capacitance for an electrode composed of carbon nanotubes and binder in FIG. 2. The electrodes were composed of 95% CNT and 5% binder. The electrodes were tested under galvanic cycling conditions, at a current of 4 A/g. After transient effects, the specific capacitance of the electrodes was about 50 F/g.

Figure 3:
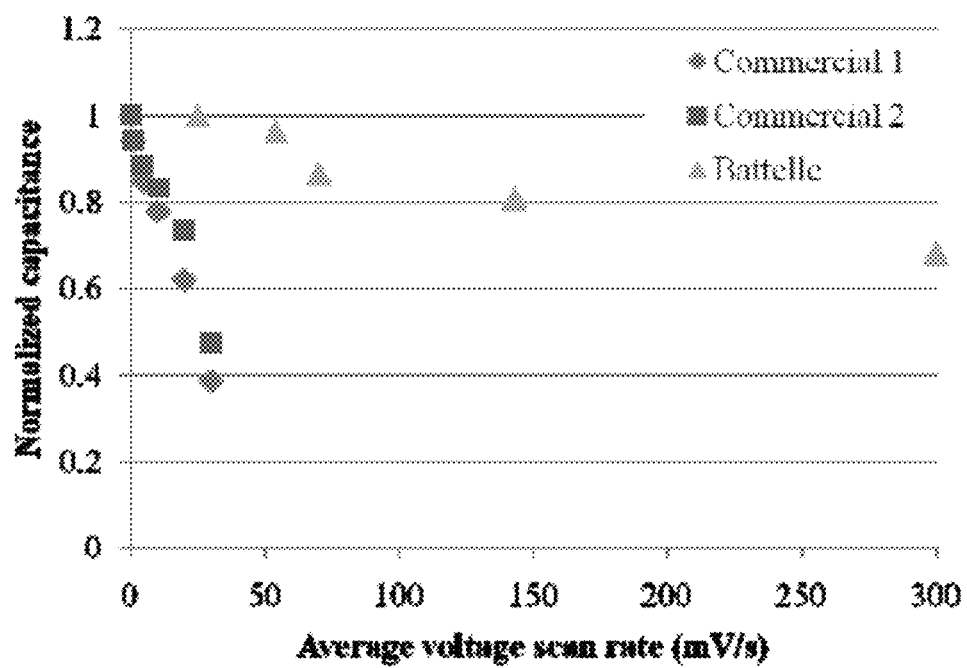
FIG. 3 illustrates the normalized capacitance at increasing voltage scan rates for two commercial capacitors and a capacitor of the invention.

Comparison of the Performance of Ni2Co-CNT Metal Oxides and Two Commercial Capacitors Electrodes were fabricated (Method A) with Ni2Co-CNT (25%) in the normal manner, then the specific capacitance was measured, and compared with two commercial double layer capacitor devices that were purchased and tested similarly. Electrochemical measurements were performed using a half-cell testing configuration in 1M KOH. FIG. 3 shows the normalized specific capacitance as a function of voltage scan rate. It can be clearly seen that, surprisingly, the inventive electrode composition demonstrates superior performance at high voltage scan rates. The inventive compositions can be characterized by the performance at high scan rates; for example, a performance as least as good as that shown in FIG. 3. The electrodes preferably have a normalized capacitance of at least 0.5 (or at least 0.7, or in the range of 0.5 to about 0.8) at an average voltage scan rate of 100 mV/s, more preferably at an average voltage scan rate of 200 mV/s, and still more preferably at an average voltage scan rate of 300 mV/s.

Example

Figure 4:
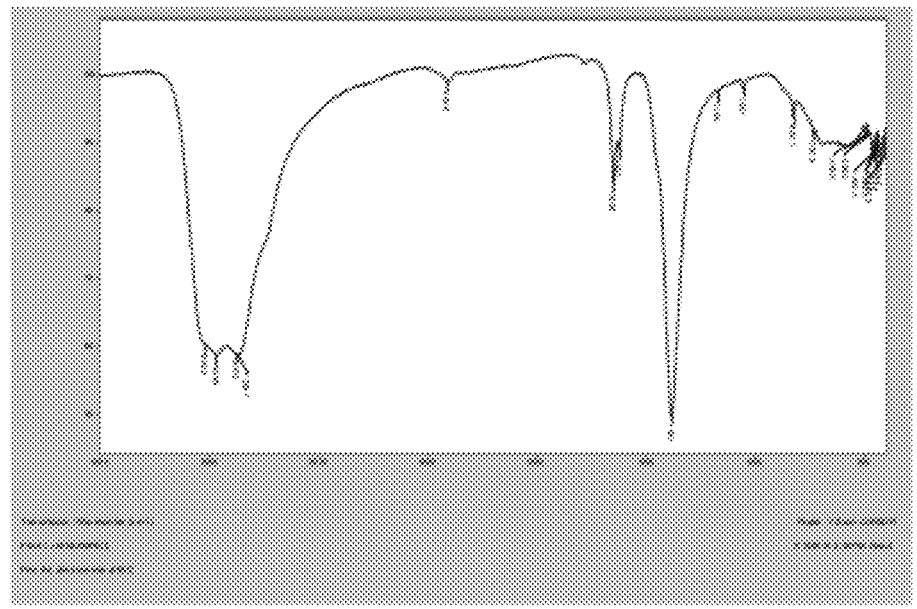
FIG. 4 is an FTIR transmission spectrum of a sample prepared according to the description in Yoon et al. dried overnight at 50° C. The x-axis of the spectrum is expressed in the conventional units of $cm^{-1}$.
Figure 5:
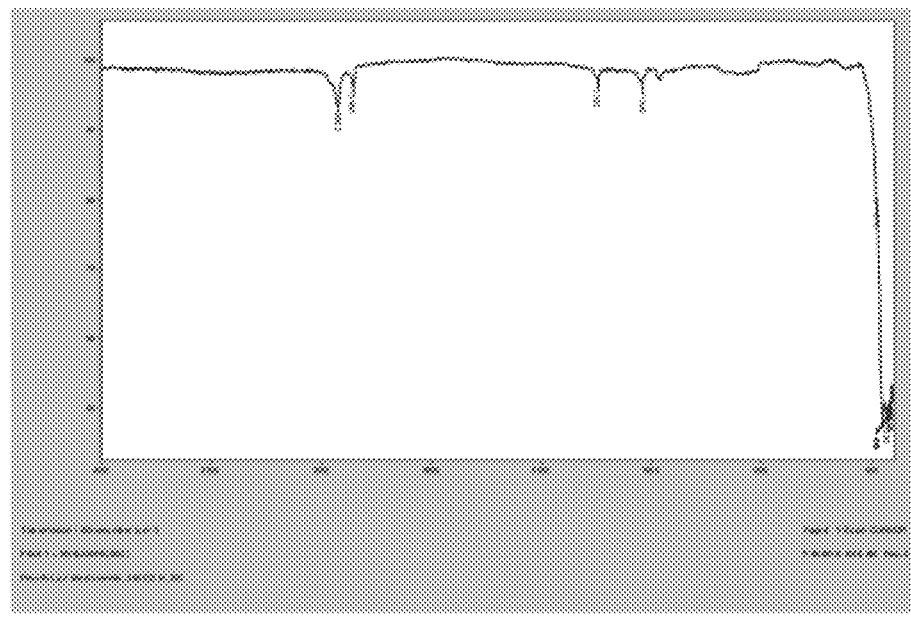
FIG. 5 FTIR transmission spectrum of a sample prepared according to the description in Yoon et al. dried at 250° C. for 2 hours.
Figure 6:
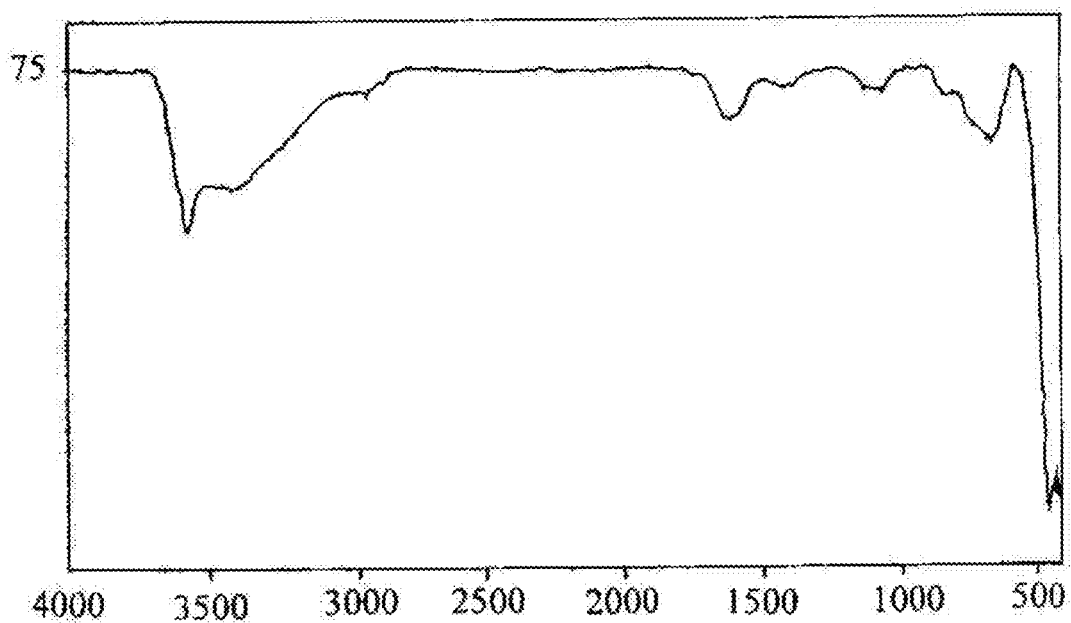
FIG. 6 FTIR transmission spectrum of Ni2Co-MWNT as made.
Figure 7:
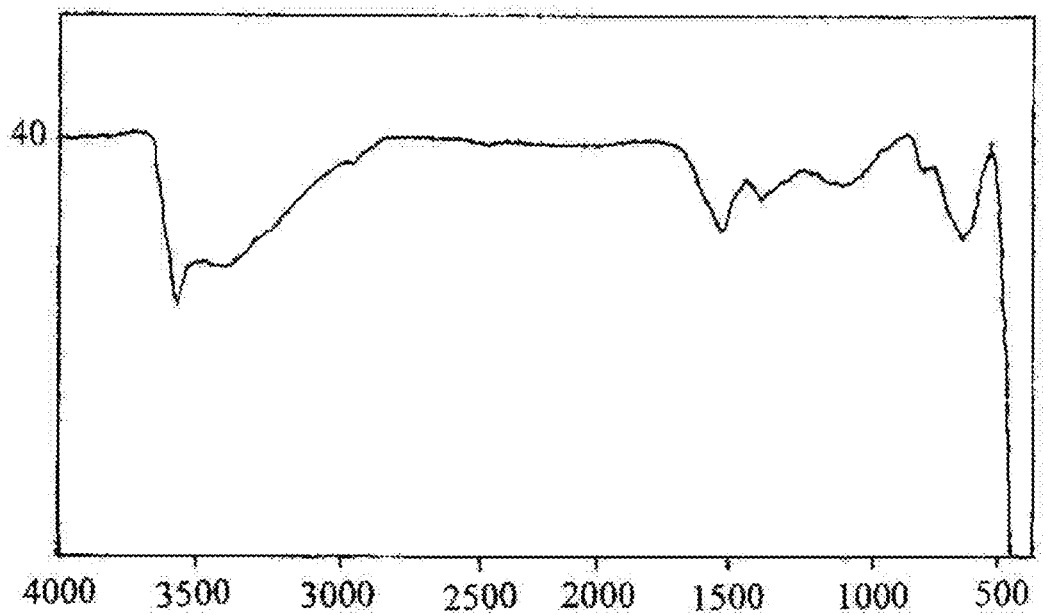
FIG. 7 FTIR transmission spectrum of Ni2Co-MWNT dried at 250° C. for 2 hours.

Comparison of the FTIR Transmission Spectra of Ni2CO-MWNT Metal Oxides and the Prior Art Electrodes were fabricated (Method A) with Ni2Co-MWNT(25%) in the normal manner, and then dried for 2 hours at 250° C. Infrared transmission spectra were collected, (scanning from 4000 $cm^{-1}$ and 500 $cm^{-1}$) before and after drying at 250° C. and compared with that of the prior art. FIGS. 4-5 show the FTIR spectra of samples prepared by a prior art method (Yoon et al.), and FIGS. 6-7 show that of the invention. Comparing the FTIR spectra of the prior art and that of the invention, it can be seen that unlike the invention, the prior art's spectra does not possess the broad hydroxyl (—OH) stretch between 3750 $cm^{-1}$ and 3000 $cm^{-1}$. Thus indicating that the prior art has formed a pure metal oxide whereas in the inventive composition, the metal hydroxyl nature remains. The absorption in the CH stretch region in the spectrum of the prior art composition is believed to be due to contamination from an organic solvent. Thus, in preferred embodiments, the invention can be characterized by absorbance in the IR spectrum of an OH stretch that is at least as intense as other absorptions in the region from 1000 to 4000 $cm^{-1}$.

Figure 8:
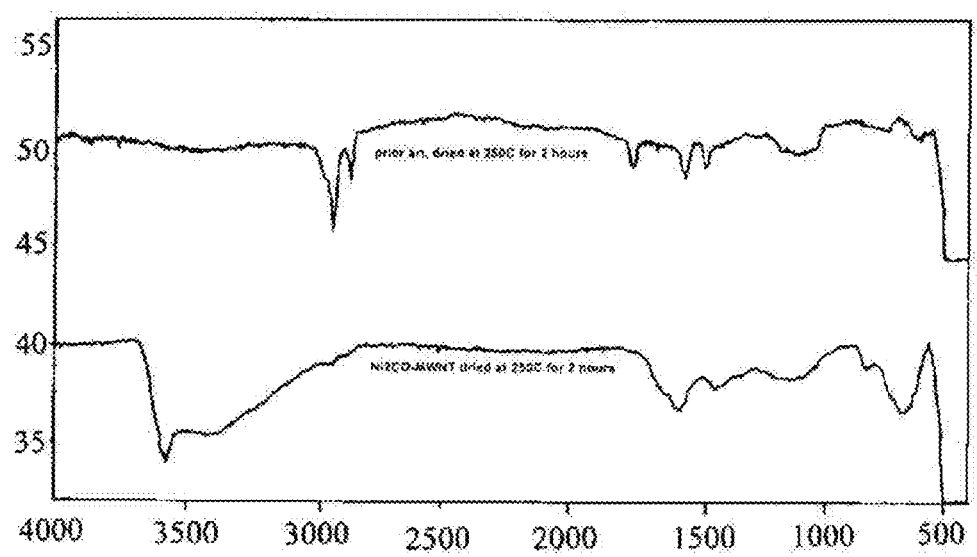
FIG. 8 FTIR transmission spectra of Yoon et al. (top) and Ni2Co-MWNT (bottom), each dried for 2 hours at 250° C.

FIG. 8 shows FTIR transmission spectra of both the prior art (top) and Ni2CO-MWNT compositions, each dried for 2 hours at 250° C.

Example 9

Performance of Ni2Co Metal Oxides at Fast Charge Rates

Figure 9:
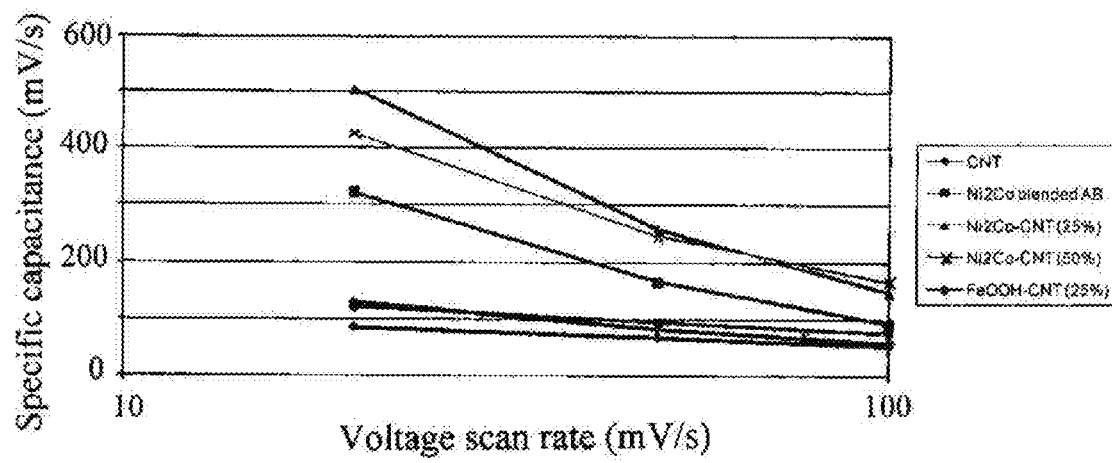
FIG. 9 illustrates the specific capacitance of Ni2Co electrodes.

We synthesized a mixed metal oxide Ni2Co, and fabricated electrodes (Method A) with this material. FIG. 9 shows the performance of these electrodes, both when fabricated then blended with AB, and when fabricated using oxide formed with the "in-situ" synthesis method. The electrodes were fabricated using 76% metal oxide, 19% additional AB, and 5% binder. These measurements were performed using a half-cell testing configuration in 1M KOH.

Example 10

Stability of Ni2Co Metal Oxides in Aqueous Electrolyte

Figure 10:
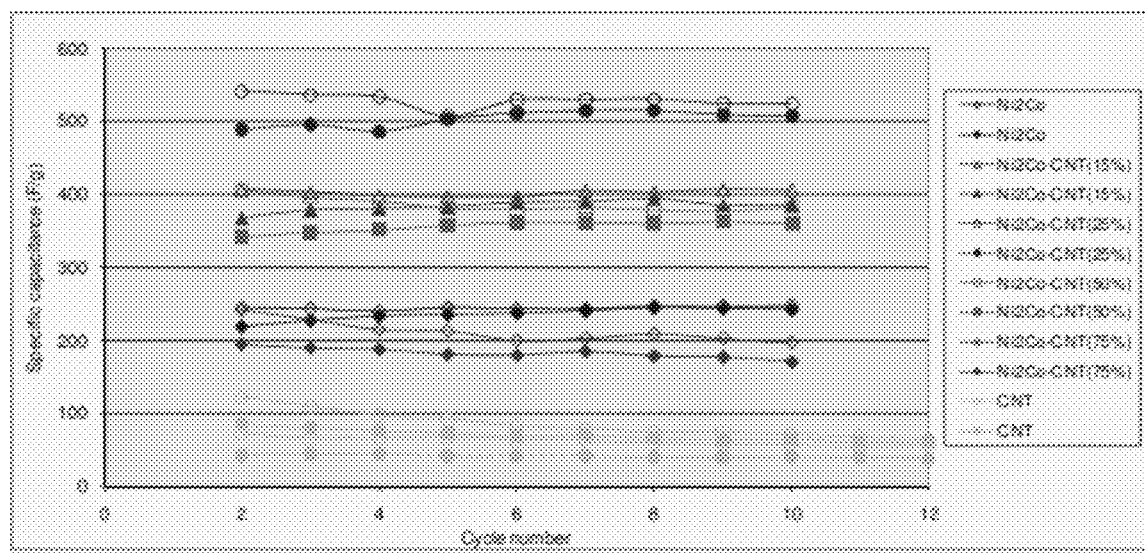
FIG. 10 illustrates the cycling stability of Ni2Co electrodes.

We fabricated electrodes (Method A) with the Ni2Co materials of the previous example. These electrodes were tested for stability under galvanic cycling in 1M KOH at a current density of 4 A/g. FIG. 10 shows the specific capacitance as a function of cycling. Thus, the inventive compositions show excellent stability in aqueous electrolyte; preferably having less than 10% decrease in specific capacitance from cycles 2 to 10; more preferably 5% or less.

Example 11

Charge Rate Dependence of Ni2Co Metal Oxides in Aqueous Electrolyte

Figure 11:
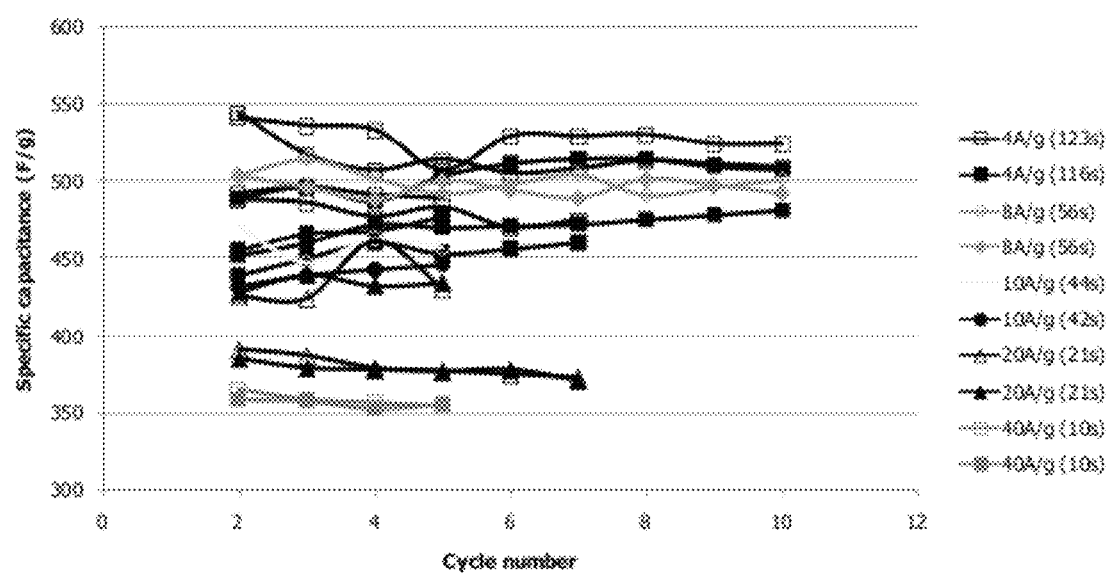
FIG. 11 illustrates the relation between specific capacitance and current density for Ni2Co electrodes.

Electrodes were fabricated (Method A) with Ni2Co-CNT (25%) in the normal manner, then the specific capacitance was measured at various current densities under galvanic cycling conditions. The testing was performed in a half-cell configuration, using 1M KOH as the electrolyte. The results are shown in FIG. 11. Increasing the specific current from 4 A/g to 40 A/g resulted in less than a 40% decrease in specific capacitance. Thus, inventive compositions can be further characterized by their specific capacitance as a function of increasing current. In preferred embodiments, the composites (when applied to a collector and tested as described above) have a response to increasing current such that increasing current from 4 A/g to 10, 20, or more preferably 40 A/g reduces specific capacitance by less than 50%, more preferably by less than 40%, and still more preferably by less than 20%.

Example 12

Full-Cell Testing in Aqueous Electrolyte

Figure 12:
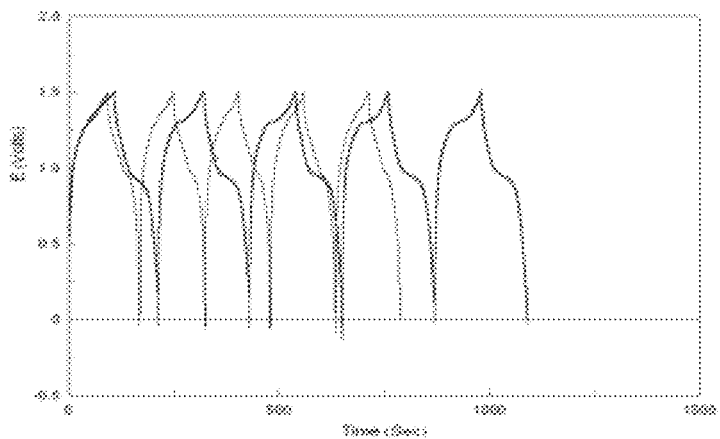
FIG. 12 shows full-cell testing of metal oxide electrodes.

Full-cell testing was performed, where metal oxide electrodes were used as both the anode and cathode. The positive electrode (1.1 mg) was composed of Ni2Co1-CNT(25 wt %) composite (79.1 wt %), AB (18.6%), Nafion (2.3 wt %). The negative electrode (1.9 mg) was composed of FeOOH-CNT (25 wt %) composite (79.1 wt %), AB (18.6%), Nafion (2.3 wt %). Testing was performed in both 1M and 4M KOH, at a current density of 3 A/g, based on combined electrode mass. FIG. 12 shows the cell voltage as a function of time for both the 1M (dark lines) and 4M (light lines) tests. The charge/discharge times, and the corresponding capacitances are given in Table 2.

TABLE 2

Performance of the full-cell capacitor

| KOH (M) | Cycle (number) | Charging time (s) | Discharging time (s) | Charging (F/g) | Discharging (F/g) |
|---|---|---|---|---|---|
| 1 | 2 | 87 | 80 | 56 | 54 |
| 4 | 2 | 108 | 109 | 72 | 72 |

The energy and power density can be calculated from this data, as shown in Table 3.

TABLE 3

Performance of the full-cell capacitor

| | Electrolyte | Charge ($2^{nd}$ cycle) | Discharge ($2^{nd}$ cycle) |
|---|---|---|---|
| P (W/kg) | 1M KOH | $1.3*10^3$ | $0.94*10^3$ |
| E(Wh/kg) | 1M KOH | 31 | 21 |
| P (W/kg) | 4M KOH | $1.3*10^3$ | $0.92*10^3$ |
| E(Wh/kg) | 4M KOH | 38 | 27 |

Example 13

Full-Cell Testing in Aqueous Electrolyte

Figure 13A:
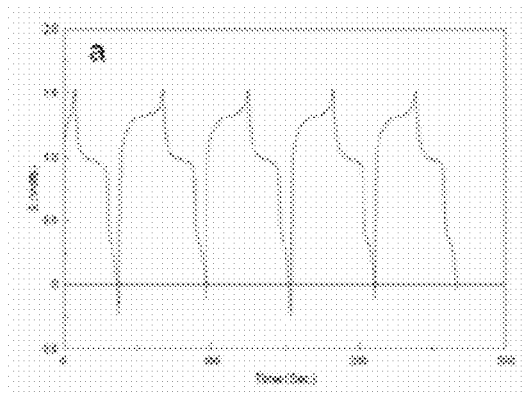
FIG. 13a shows full-cell testing at 4 A/g.
Figure 13B:
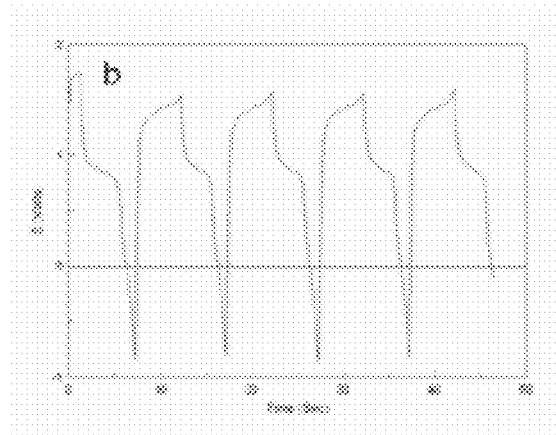
FIG. 13b shows full-cell testing at 20 A/g.

A second full-cell test was performed, to determine the capacitance at different charge-discharge rates. The positive electrode (0.8 mg) was fabricated from Ni2Co1-CNT (25 wt %) and the negative electrode (0.9 mg) was fabricated from FeOOH-CNT (50 wt %). The voltage as a function of time when tested at a current density of 4 A/g total electrode mass are shown in FIG. 13a, while the results for testing at 20 A/g are given in FIG. 13b. The energy and power density can be calculated from this data, and are given in Table 4.

TABLE 4

Performance of the full-cell capacitor

| | Specific current | Charge ($2^{nd}$ cycle) | Discharge ($2^{nd}$ cycle) |
|---|---|---|---|
| P (W/kg) | 4 A/g | $5.13*10^3$ | $3.33*10^3$ |
| E(Wh/kg) | 4 A/g | 42.6 | 26.4 |
| P (W/kg) | 20 A/g | $27.5*10^3$ | $15.8*10^3$ |
| E(Wh/kg) | 20 A/g | 36.6 | 18.0 |

Example 14

Performance & Reproducibility of Ni4Co Metal Oxides Electrodes at Fast Voltage Scan Rates We synthesized a mixed metal oxide Ni4Co, and fabricated electrodes (Method B) with this material. In Method B, the oxide material was calcined at 450° C. to provide more reproducible specific capacitance. Table 5 shows the performance of these electrodes. The electrodes were fabricated using 75% Ni4Co, 25% AB, and 5% binder. These measurements were performed using a half-cell testing configuration in 1M KOH and at fast voltage scan rate of 20 mV/s for 5 cycles. Variation in the weight after drying is much lower using the calcined material, however the overall performance was decreased by the calcining.

TABLE 5

| Sample number | Electrode weight (mg) | Scan (cycle) | Capacitance (F/g) |
|---|---|---|---|
| 52819-4-10 | 0.87 | 5th | 252 |
| 52819-4-12 | 0.86 | 5th | 283 |
| 52819-4-14 | 0.86 | 5th | 224 |
| 52819-4-16 | 0.84 | 5th | 323 |
| 52819-4-18 | 0.79 | 5th | 324 |
| 52819-4-20 | 0.88 | 5th | 301 |
| Average | | | 284 |
| Standard deviation | | | 36 or 13% |
| 52819-5-1 | 0.83 | 5th | 313 |
| 52819-5-2 | 0.83 | 5th | 327 |
| 52819-5-3 | 0.78 | 5th | 263 |
| 52819-5-4 | 0.72 | 5th | 315 |
| Average | | | 304 |
| Standard deviation: | | | 24 or (8%) |

Example 15

Performance Multiple Layered Ni4Co Metal Oxides Electrodes at Fast Voltage Scan Rates We synthesized mixed metal oxides Ni4Co of two compositions, 75% Ni4Co/25% AB, and 90% Ni4Co/10% AB, both with 5% binder. Electrodes were fabricated according to Method B except modified as follows:

A 1st layer of metal oxide paste (10 μL) was applied to the Nickel current collector, and the obtained uniform film dried in air for 4 hours, and the weight of the electrode material recorded. Then, a $2^{nd}$ layer of metal oxide paste (10 μL) was applied to the first layer, and the obtained uniform film dried in air for 6 hours, and the weight of the electrode material recorded.

The constructed electrode was then completed as for Method B. Capacitance measurements were performed using a half-cell testing configuration in 1M KOH and at fast voltage scan rate of 20 mV/s for 5 cycles. Table 6 shows the performance of these electrodes. The data indicates that multiple layers of metal oxide give higher capacitance than a single deposition layer, and capacitance is highest when the first layer is 90% Ni4Co1/10% AB. Also, the capacitance for the deposition of two layers of the same material gives higher capacitance than a single deposition of the same mass.

TABLE 6

| Sample number | 1st layer | Net electrode weight (mg) at 4 hours | 2nd layer | Net electrode weight (mg) at 10 hours | Total net weight (mg)* | Capacitance (F/g) |
|---|---|---|---|---|---|---|
| 52819-10-1 | 75% Ni4Co1 25% AB | 0.49 | 75% Ni4Co1 25% AB | 0.45 | 0.94 | 460 |
| 52819-10-2 | 75% Ni4Co1 25% AB | 0.43 | 75% Ni4Co1 25% AB | 0.43 | 0.86 | 480 |
| Average | | | | | | 470 |
| 52819-10-4 | 75% Ni4Co1 25% AB | 0.43 | 75% Ni4Co1 25% AB | 0.08 | 0.51 | 500 |
| 52819-10-5 | 7575% Ni4Co1 25% AB | 0.44 | 75% Ni4Co1 25% AB | 0.05 | 0.49 | 462 |
| Average | | | | | | 481 |
| 52819-10-7 | 75% Ni4Co1 25% AB | 0.49 | 90% Ni4Co1 10% AB | 0.46 | 0.95 | 483 |
| 52819-10-8 | 75% Ni4Co1 25% AB | 0.50 | 90% Ni4Co1 10% AB | 0.46 | 0.96 | 494 |
| Average | | | | | | 488 |
| 52819-10-10 | 90% Ni4Co1 10% AB | 0.45 | 75% Ni4Co1 25% AB | 0.54 | 0.99 | 577 |
| 52819-10-11 | 90% Ni4Co1 10% AB | 0.38 | 75% Ni4Co1 25% AB | 0.49 | 0.87 | 625 |
| Average | | | | | | 601 |
| 52819-10-13 | 90% Ni4Co1 10% AB | 0.38 | 90% Ni4Co1 10% AB | 0.47 | 0.85 | 612 |
| 52819-10-14 | 90% Ni4Co1 10% AB | 0.32 | 90% Ni4Co1 10% AB | 0.47 | 0.79 | 695 |
| Average | | | | | | 654 |

*Used for capacitance calculation

Example 16

Performance of Ni4Co Metal Oxides Electrodes Prepared with Different Drying Conditions at Fast Voltage Scan Rates We synthesized a mixed metal oxide Ni4Co, and fabricated electrodes (Method B). The electrodes were dried in air for 1 hour before experiencing the various drying treatments prior to electrochemical characterization. Table 7 describes the various drying procedures, and shows the performance of these electrodes. The electrodes were fabricated using 75% Ni4Co, 25% AB, and 5% binder. These measurements were performed using a half-cell testing configuration in 1M KOH and at fast voltage scan rate of 20 mV/s for 5 cycles. The best capacitance is when the electrode is dried in air at room temperature overnight, and higher temperature heating reduced the performance. Only a slight difference in performance was observed with the presence of a vacuum, and electrodes dried for a short time of 1 or 2 hours were not reproducible and the capacitances may be very low. The general trend: the longer the drying time, the better the capacitance.

TABLE 7

| Sample number | Net electrode weight at 1 hour (mg)* | Drying conditions | Capacitance (F/g)* |
|---|---|---|---|
| 52819-25-3 | 1.11 | Vacuum dried for several minutes and then air dried overnight | 497 |
| 52819-25-4 | 1.18 | Vacuum dried for several minutes and then air dried overnight | 501 |
| Average | | | 499 |
| 52819-25-5 | 1.10 | Vacuum dried overnight, 40° C. | 258 |
| 52819-25-6 | 1.13 | Vacuum dried overnight, 40° C. | 241 |
| Average | | | 250 |
| 52819-25-7 | 1.03 | Vacuum dried overnight, 75° C. | 262 |
| 52819-25-8 | 1.12 | Vacuum dried overnight, 75° C. | 263 |
| Average | | | 262 |
| 52819-25-9 | 1.05 | Overnight, 60° C., in air | 264 |
| 52819-25-10 | 0.99 | Overnight, 60 C., in air | 297 |
| Average | | | 280 |
| 52819-27-1 | 1.01 | 1 hour, in air | 205 |
| 52819-27-2 | 1.18 | 1 hour, in air | 39 |
| Average | | | 122 |
| 52819-27-3 | 1.18 | 2 hours, in air | 223 |
| 52819-27-4 | 1.14 | 2 hours, in air | 249 |
| 52819-26-4 | 1.06 | 2 hours, in air | 285 |
| 52819-26-5 | 1.14 | 2 hours, in air | 103 |
| Average | | | 215 |
| 52819-26-6 | 1.17 | 5 hours, in air | 306 |
| 52819-26-7 | 1.19 | 5 hours, in air | 312 |
| Average | | | 309 |
| 52819-26-2 | 1.09 | Overnight, in air | 443 |
| 52819-26-9 | 1.10 | Overnight, in air | 460 |
| 52819-25-2 | 1.08 | Overnight, in air | 519 |
| Average | | | 474 |

Example 17

Performance of Ni4Co Metal Oxides Electrodes Prepared with Increasing Electrode Mass at Fast Voltage Scan Rates We synthesized a mixed metal oxide Ni4Co, and fabricated electrodes according to Method B except the amount of Nickel deposited was varied. In this experiment, 10, 22, 33, 44, or 66 μL of paste solution was applied onto a Ni substrate.

The obtained uniform film was dried in air for 1 hour before being stored in a close desiccator for 1 hour with controlled humidity (22%). The electrodes were fabricated using 75% Ni4Co, 25% AB, and 5% binder. These measurements were performed using a half-cell testing configuration in 1M KOH and at fast voltage scan rate of 20 mV/s for 5 cycles. Table 8 shows the performance of these electrodes. The data shows that increasing the electrode mass lowers the specific capacitance.

TABLE 8

| Sample number | Paste solution (μl) | Net electrode weight at 1 hour (mg) in air* | Capacitance (F/g)* |
|---|---|---|---|
| 52819-28-1 | 10 | 0.40 | 468 |
| 52819-28-2 | 10 | 0.43 | 420 |
| Average | | | 444 |
| 52819-28-3 | 22 | 0.93 | 387 |
| 52819-28-4 | 22 | 0.92 | 385 |
| 52819-28-5 | 22 | 0.87 | 360 |
| 52819-28-6 | 22 | 0.88 | 400 |
| 52819-28-8 | 22 | 0.85 | 398 |
| Average | | | 386 |
| 52819-28-9 | 33 | 1.25 | 379 |
| 52819-28-10 | 33 | 1.24 | 370 |
| Average | | | 374 |
| 52819-28-11 | 44 | 1.74 | 308 |
| 52819-28-12 | 44 | 1.58 | 314 |
| Average | | | 311 |
| 52819-28-11 | 66 | 2.33 | 238 |
| 52819-28-12 | 66 | 2.46 | 246 |
| Average | | | 242 |

Example 18

Effect of Calcining of Ni2Co-MWNT Metal Oxides Electrodes

The electrodes were fabricated (Method A) with the as-prepared Ni2Co-MWNT material and the Ni2Co-MWNT material that was calcined at 250° C. for 2 hours. These measurements were performed using a half-cell testing configuration in 1M KOH and at fast voltage scan rate of 20 mV/s for 5 cycles. Table 9 shows the capacitance results. The capacitance was greatly decreased by calcining the material.

TABLE 9

| Sample | Electrode Weight | Capacitance |
|---|---|---|
| BCO - As-Made 1 | 0.76 mg | Electrode slid off substrate |
| BCO - As-Made 2 | 0.96 mg | 146.1 F/g |
| BCO - As-Made 3 | 1.00 mg | 174.1 F/g |
| BCO - Heat-treated 1 | 0.89 mg | 52.7 F/g |
| BCO - Heat-treated 2 | 0.88 mg | 37.9 F/g |
| BCO - Heat-treated 3 | 0.89 mg | 66.3 F/g |

What is claimed:

1. A capacitor comprising: an electrode, and wherein the electrode comprises: Ni and Co in a molar ratio of greater than 0.5:1; wherein the electrode comprises no more than 5 mass % $TiO_2$; and further possessing one or more of the following characteristics:
   (a) the electrode comprises a specific capacitance of at least 450 F/g·cm² if measured at a voltage scan rate of 20 mV/s in 1M KOH aqueous electrolyte; or
   (b) absorbance in the IR spectrum of an OH stretch that is at least as intense as other absorptions in the region from 1000 to 4000 cm$^{-1}$.

2. The capacitor of claim 1 wherein the electrode comprises Ni and Co in a molar ratio of 2:1 to 4:1.

3. The capacitor of claim 1 wherein the electrode comprises a metal oxide and the transition metals in the metal oxide consist essentially of Ni and Co.

4. The capacitor of claim 3 wherein the metal oxide is characterizable by an absorption band in the infrared region between 3750 and 3000 cm$^{-1}$.

5. The capacitor of claim 1 wherein the electrode comprises 5 weight % or less of binder.

6. The capacitor of claim 1 wherein the electrode further comprises carbon.

7. The capacitor of claim 1 wherein the electrode has a mass in the range of 0.1 to 2 mg.

8. The capacitor of claim 1 wherein the electrode comprises a specific capacitance in the range of 450 F/g to 695 F/g if measured at a voltage scan rate of 20 mV/s in 1M KOH aqueous electrolyte.

9. The capacitor of claim 1 wherein the electrode comprises 40 to 90 weight % metal oxide nanoparticles and 10 to 60 weight % carbon.

10. The capacitor of claim 1 wherein the electrode comprises at least 5 weight % carbon nanotubes.

11. The capacitor of claim 1 wherein the electrode is composed of multiple layers.

12. The capacitor of claim 11 wherein the electrode comprises a specific capacitance of at least 650 F/g if measured at a voltage scan rate of 20 mV/s in 1M KOH aqueous electrolyte.

13. The capacitor of claim 1 wherein the electrode comprises a current collector, and a composite comprising Ni and Co in a molar ratio of greater than 0.5:1, and wherein a denser layer of the composite is deposited closer to the current collector, and wherein the denser layer is more conductive than a second layer of the composite that is further from the current collector.

14. The capacitor of claim 1 wherein the electrode consists essentially of a current collector and one or more layers of composite material.

15. A capacitor comprising: a first electrode of claim 1; an electrolyte; a second electrode; and a circuit that can form an electrical pathway between the first electrode and the second electrode.

16. The capacitor of claim 15 wherein the electrolyte is a nonaqueous liquid.

17. The capacitor of claim 1 wherein the first and second electrodes have substantially the same composition.

18. A method of storing energy comprising: applying a potential to the capacitor of claim 1 and removing the potential; and wherein, after the potential is removed, an electrical potential persists between the electrodes.

19. A solar energy system comprising the capacitor of claim 1 and a photovoltaic cell.

20. A method of making an electrode, comprising:
   forming a composition comprising Ni and Co in a molar ratio of 0.5:1 to 6:1;
   reacting the composition to form a gel comprising Ni and Co in a molar ratio of 0.5:1 to 6:1;
   drying the gel to obtain a powder comprising Ni and Co in a molar ratio of 0.5:1 to 6:1; and
   compacting the powder to form an electrode.

21. The method of any of claim 20 wherein the temperature of the process never exceeds 200° C.

22. The method of claim 20 wherein the temperature of the process never exceeds 50° C.

23. The method of claim 20 wherein the electrode is subjected to a single step of drying.

24. The method of claim 20 wherein the composition is dried for more than 5 hours.

* * * * *